United States Patent [19]

d'Alayer de Costemore d'Arc

[11] 4,380,031

[45] Apr. 12, 1983

[54] CONTROL FOR BIDIRECTIONAL DRIVE RESPONSIVE TO GAPS IN RECORDED SOUND

[75] Inventor: Stephane M. A. d'Alayer de Costemore d'Arc, Genappe, Belgium

[73] Assignee: Staar S.A., Belgium

[21] Appl. No.: 196,754

[22] Filed: Oct. 14, 1980

[30] Foreign Application Priority Data

Mar. 14, 1980 [BE] Belgium .............................. 1/99789

[51] Int. Cl.³ .............................................. H04N 9/16
[52] U.S. Cl. .................................. 360/74.1; 360/72.1; 242/201
[58] Field of Search ....................... 360/74.1, 74.4, 71, 360/73, 50, 96.1, 96.3, 137; 242/189–191, 200, 201–202

[56] References Cited

U.S. PATENT DOCUMENTS

| | | | |
|---|---|---|---|
| 3,665,117 | 5/1972 | Staar | 360/71 X |
| 4,026,496 | 5/1977 | Kaneda | 242/191 |
| 4,173,320 | 11/1979 | Schatteman | 242/201 X |
| 4,202,220 | 5/1980 | Matsumoto | 242/201 X |
| 4,212,438 | 7/1980 | Schatteman | 242/201 |
| 4,225,894 | 9/1980 | Fulukawa et al. | 360/74.1 X |
| 4,228,472 | 10/1980 | Magata et al. | 360/72.1 X |

Primary Examiner—John H. Wolff
Attorney, Agent, or Firm—Leydig, Voit, Osann, Mayer and Holt, Ltd.

[57] ABSTRACT

In a tape transport having a bidirectional drive for movement of tape at playback speed and fast speed in either direction, including a reversing mechanism, signal detection circuit means for receiving audio signals from one or the other sets of head channels and for producing actuating signals in response to a silence interval of predetermined minimum duration in audio signals indicating a silence period between recordings on the corresponding set of recording tracks, a control for the drive including a member having two states representing the respective directions of tape movement, connected for switching the sets of head channels to accommodate the direction of tape movement upon reversal of the drive, and disconnected from switching the sets of head channels upon reversal of the drive for movement of the tape at fast rewind speed, so as to maintain the same set of head channels enabled when the drive is shifted to fast forward or fast rewind in order to playback the same tracks for detection of silence intervals as those selected for listening.

15 Claims, 7 Drawing Figures

CONTROL FOR BIDIRECTIONAL DRIVE RESPONSIVE TO GAPS IN RECORDED SOUND

The present invention relates to tape transport apparatus for the recording and reproduction of magnetic tapes, having bidirectional drives for moving the tape at playback speed and fast speed in either direction.

Such apparatus generally comprises pushbuttons for the fast forward wind and rewind of the magnetic tape, and U.S. Pat. No. 4,212,438, describes an apparatus of this type which uses the device for reversing the direction of travel to ensure that the "fast rewind" pushbutton always controls the fast rewind of the magnetic tape and the "fast forward" pushbutton always controls its fast forward wind, whatever the direction of travel of the magnetic tape.

U.S. Pat. No. 3,665,117 describes a control system, incorporated in tape transports having a tape drive allowing tape movement at playback speed in only one direction, which automatically causes the tape to resume playback speed responsive to the detection of a silence interval between recorded passages on the tape during fast rewind or fast forward movement of the tape.

Such a system is at present enjoying considerable commercial success and it therefore appears desirable to apply it to tape transports having bidirectional drives.

It is common, however, in bidirectional apparatus to switch from one set of track playback head channels to the other set of channels, as a function of the direction of travel of the magnetic tape, and this is incompatible with a system which detects the silence between recordings carried by the tape. In such a system, the enabled playback head channels must correspond to the selected tracks of the tape, or "side" of the cassette, whatever the direction of travel of the magnetic tape at fast speed.

The main object of the present invention is, therefore, to provide an apparatus which detects the silence between recordings on the tape, which may be incorporated in tape transports having bidirectional drives.

Another object is to provide such an apparatus which may be so incorporated with a minimum of modifications in the bidirectional mechanisms and without substantially increasing their production costs.

To achieve this object, tape transports of the bidirectional type in which the playback channels of the magnetic head are switched as a function of the direction of travel of the tape, are provided with apparatus for detecting the silences between the recordings which has means for maintaining the same set of head channels enabled when the drive is shifted to fast forward or fast rewind in order to playback the same tracks for detection of silence intervals as those selected for listening.

Another object of the invention is to ensure that when the tape transport drive is brought automatically into the playback position responsive to the detection of a silence interval, the state of the switch means for the head channels is checked so that the proper set of head channels is enabled to playback the selected track or tracks.

Another object is to provide such an apparatus in which the head channels are disengaged before a reversal in the direction of travel of the tape, when the selection device is brought into the operating position.

According to a mechanical embodiment of the invention, the pick-up head is provided with switch means actuated by a lever mounted on a movable plate and operated by apparatus for reversing the drive and direction of tape travel; the movable plate is moved to disconnect the lever from the switch means once either one of the "fast forward" or "fast rewind" pushbuttons are actuated.

According to another embodiment of the invention, the switching of the pick-up head channels is effected electronically.

An advantageous features is that means are provided with which it is possible to switch the head channels when the head is re-engaged with the tape, so as to ensure that the head detects signals from the tracks corresponding to the direction of movement of the tape.

Two embodiments of the invention are described below with reference to the drawings.

FIGS. 1, 2, 3 and 4 are plan views of a mechanical embodiment of the invention in which the apparatus is in the following respective positions:

FIG. 1 during playback of the magnetic tape at normal playback speed in one direction;

FIG. 2 during operation of the reversing device to return the apparatus from the fast rewind position to the playback position;

FIG. 3 during fast rewind of the magnetic tape;

FIG. 4 during playback of the magnetic tape travelling in the reverse direction at normal playback speed to that in FIG. 1;

Figure 1:
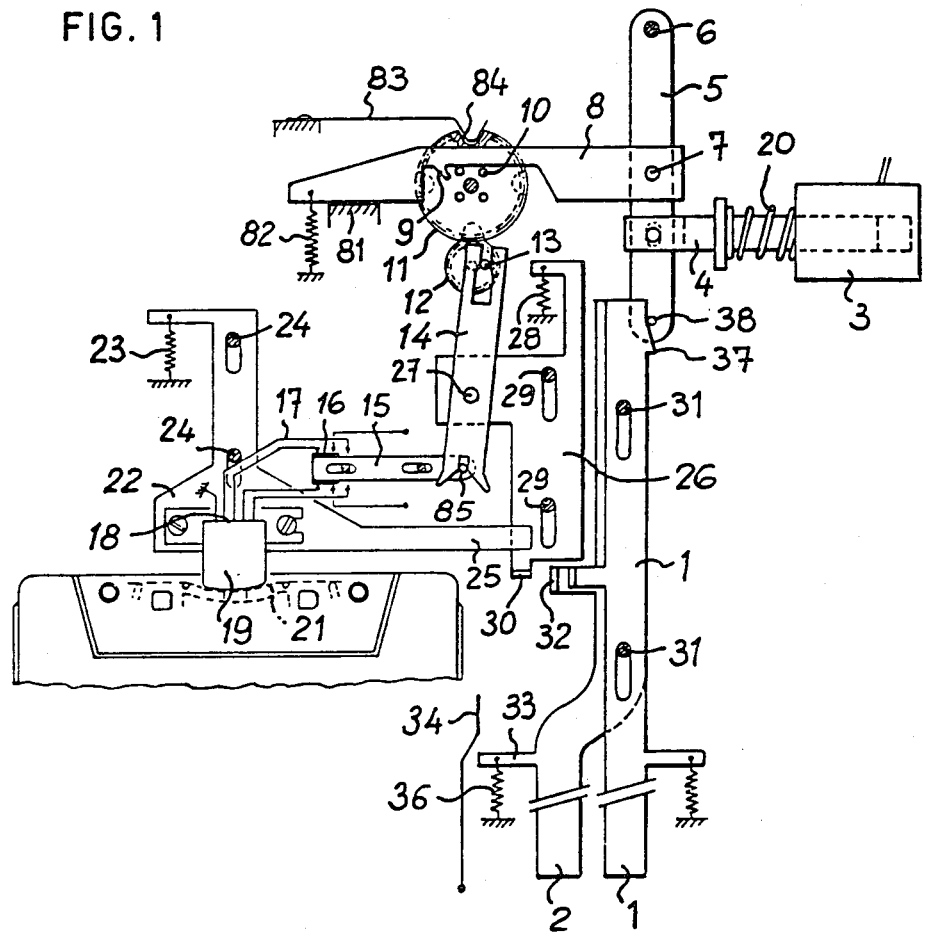
FIG. 1A is a detailed view of the pushbutton latching means.

A. Mechanical Embodiment (FIGS. 1 to 4)

The present invention is incorporated in a tape transport having a bidirectional drive preferably of the type shown and described in the aforementioned U.S. Pat. No. 4,212,438, in which the direction of travel of the magnetic tape is reversed by a mechanism including a reversing solenoid 3. Manual controls are provided including a fast forward pushbutton actuator 1 and a fast rewind pushbutton actuator 2. Responsive to manual movement of the actuator 2, the reversing solenoid 3 shifts the drive to the rewind direction by mechanism including the solenoid core 4 which is articulated to a lever 5 capable of pivoting about an axle 6 integral with the chassis of the apparatus.

The tape speed is raised to fast speed by means not shown, but which may be of the type disclosed in said patent. This lever 5 bears an axle 7 on which there is mounted an arm 8 which is reciprocated by the lever 5, the arm 8 being held at its other end against a fixed stop 81 by a spring 82. Reciprocation of the arm 8 is converted to rotary motion of a wheel 11 by a hook 9 capable of acting in the manner of a pawl on studs 10, of which there are four, borne by the wheel 11.

The wheel 11 is held in each of four fixed positions by a plate spring 83 fixed to the chassis and acting in notches 84 provided on the periphery of the wheel 11. The wheel 11 has peripheral teeth meshing with a second toothed wheel 12 bearing a crank pin 13. As shown in U.S. Pat. No. 4,212,438 to which reference may be made for further details, the crank pin 13 acts on the gear mechanism (not shown) of the capstan drive 40 and shifts the direction of the drive as the crank pin 13 rotates.

The apparatus also includes a soundtrack pick-up head 19 which engages the tape, having two sets of head channels for detecting recordings on respective sets of recording tracks on recording tape, together with switch means 16 for enabling one set of channels or the other.

In carrying out the present invention, means are provided connecting the reversing solenoid 3 for the drive to the switch means 16, herein shown in this mechanical embodiment as including a linkage having a lever 14 rocked by the crank pin 13 as the reversing solenoid operates so that the lever 14, coincidentally with the shift in direction of the tape drive, acts on the slide element 15 of the electric switch 16 to which the sets of channels 18 of the pick-up head 19 are connected by conductors 17, for enabling one set or the other of the head channels, as the lever 14 rocks from one side to the other.

Since the ratio of the numbers of teeth on the wheels 11 and 12 is two to one, each quarter turn of the wheel 11 produces a half turn of the wheel 12, and 180° rotation of the crank pin 13.

With the construction shown, once the reversing solenoid 3 is energized (at the end of the tape or by actuation by user), the core 4 is attracted towards a spring 20, causing the lever 5 to pivot about the axle 6 in an anti-clockwise direction.

As it pivots, the lever 5 entrains the arm 8 in a translational movement, and the arm 8 acts by means of its hook 9 on one of the studs 10 borne on the wheel 11. The wheel 11 and crank pin 13 rotates about 90°, while the wheel 12 turns about 180°, causing the lever 14 acting on the slide 15 to pivot. Thus, the lever 14 is rocked from one state to another by the crank pin 13, and the state of the lever 14 represents the direction of the drive.

By means of the lever 14 and the switch means 16, the channels of the magnetic head 19 are thus always switched from one set to the other as a function of the direction of of travel of the tape, when the tape is driven at normal speed.

The magnetic head 19 in contact with the magnetic tape 21 is mounted on a plate 22 which is subjected to the action of a spring 23 and which can perform a translational movement, this movement being guided and limited by axles 24 integral with the fixed chassis of the apparatus. The magnetic head is so mounted for movement in a direction to relieve during fast speed movement, the tension of the tape applied against the head at normal speed, to reduce abrasion of the tape and head. In order to move the plate 22 and the magnetic head 19 on the plate, this plate 22 bears an arm 25 extending in a direction perpendicular to the direction of translation of the plate 22 in the example illustrated.

Further according to the invention, means are provided for disconnecting the lever 14 from the slide 15 to preclude actuation of the switching means 16 during fast rewind; this disconnecting means is herein shown as a second moving plate 26 which bears the pivot axle 27 of the lever 14 and which is able to perform a translation movement parallel to the direction of the plate 22 and which is subjected to the action of a spring 28. This translation is limited and guided by axles 29 which are integral with the chassis. This second plate 26 bears a stop 30 which is arranged so as to act on the arm 25 in such a way as to control the translation of the plate 22 on which the magnetic head is mounted.

In carrying out the present invention, the sets of channels 18 of the magnetic head 19 are switched in a different manner when the fast rewind controls are operated than when the tape drive is reversed at normal playback or recording speed. This is preferably achieved by disconnecting said lever 14 from the slide 15 of the switch means 16 upon reversal of the drive at fast rewind speed. Thus, when the tape drive is reversed for fast rewind, the switch slide 15 remains stationary and the head channels are not switched so that the same set of channels corresponding to the selected side of the cassette remain enabled to playback the selected tracks of the tape when the tape moves at fast speed in the rewind direction. For this purpose, the second plate 26 is moved responsive to the actuation of the fast rewind pushbutton 2. Accordingly, when the user wishes to listen again to the recording which he has just heard, he actuates the fast rewind pushbutton 2 and, guided by the axles 31, this button 2 acts via a tenon 32 on the plate 26 so as to cause the retracting of this plate, which disengages the lever 14 from the control tenon 85 of the switch slide 15.

Figure 2:
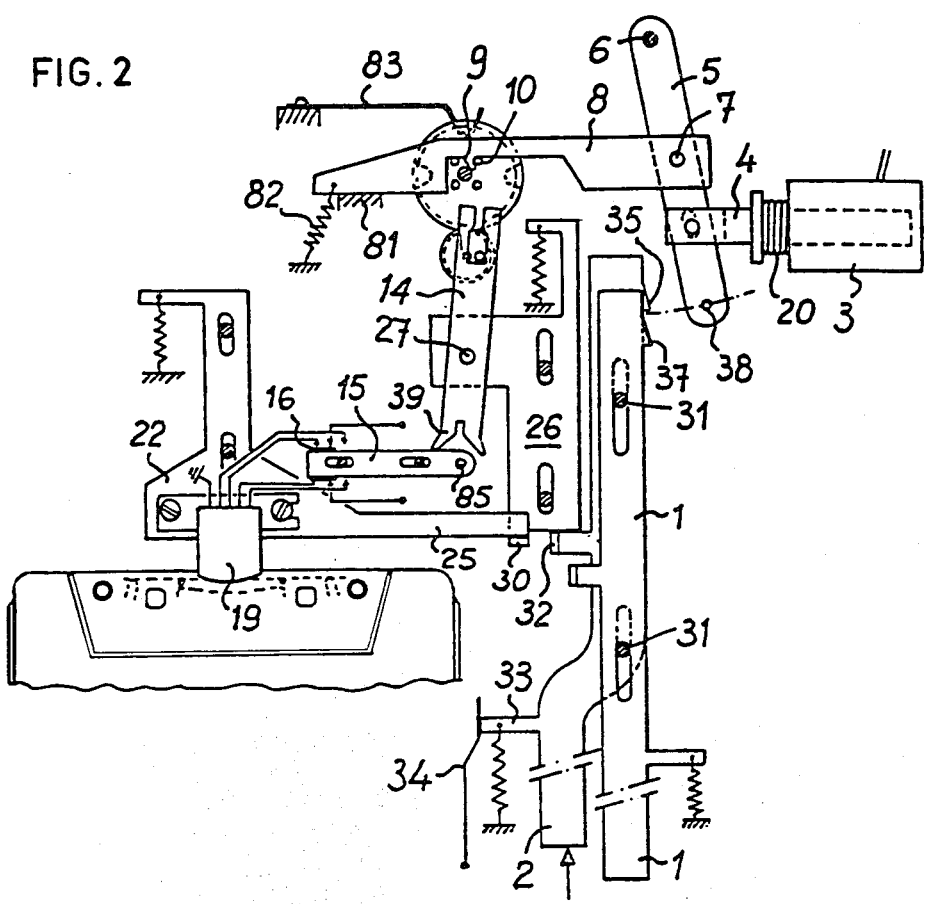

Once this means disconnecting the lever 14 from the switch slide 15 has been operated, the plate 26 then acts via its stop 30 on the arm 25, causing the retraction of the plate 22 and of the magnetic head 19 (FIG. 2). As the plates 26 and 22 from then on effect the same translational movement, the lever 14 and the tenon 85 remain disengaged and the switch slide 15 is not moved by the lever 14.

The button 2 then acts via a tenon 33 (FIG. 1) on a switch 34 to close the circuit (not shown) to the solenoid 3 to activate the solenoid to reverse the direction of travel of the magnetic tape so as to permit it to travel in the reverse direction (fast rewind). The fast rewind actuator button 2 is latched in by means including a pawl 35 (FIG. 1A) provided at the end of the button 2 which hooks over the lever 5 (tenon 38) so as to latch the button 2 in the operating position, similar latching means also being provided including a pawl 37 to latch the fast forward push button 1 in the operating position upon actuation thereof.

Figure 3:
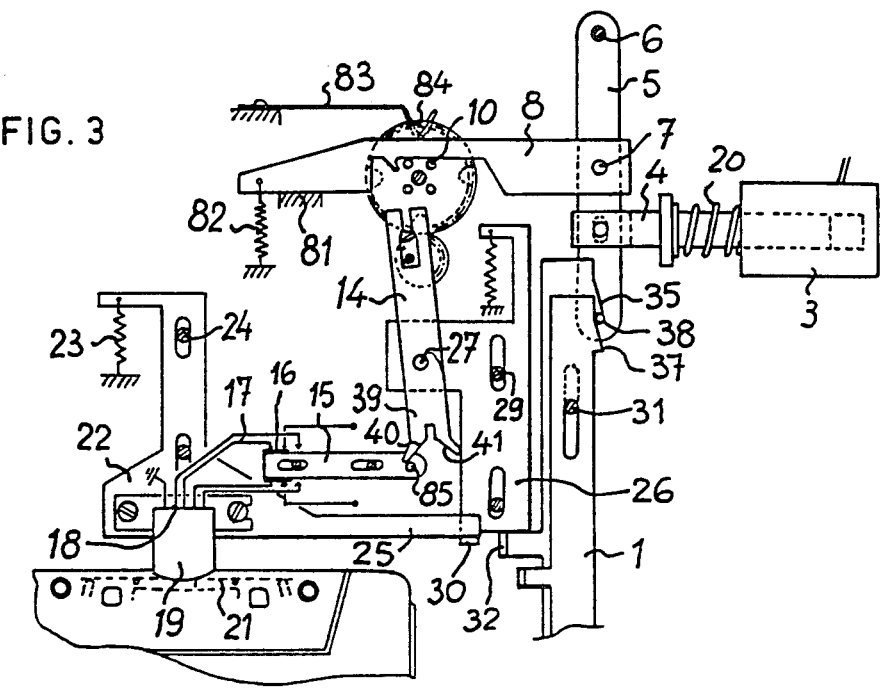

The solenoid 3 when actuated by the control for reversing the direction of travel of the tape, rotates the toothed wheels 11 and 12 and consequently rocks the lever 14 to place it in the position shown in FIG. 3. However, due to the disengagement of this lever from the tenon 85 of the switch slide 15, the reversal of the direction of travel of the tape for fast rewind does not change the position of the switch slide 15.

As shown in FIG. 3, the reversing solenoid 3 when operated for fast rewind thus does not displace the switch slide 15 of the switch 16 for the channels of the magnetic head 19 and the same set of head channels is enabled to detect audio signals recorded in the same set of recording tracks being played when the tape was moving in the forward playback direction, before the fast rewind control was operated.

Once the beginning of a sound recording has passed and a sufficiently long silence interval is detected, the silence detector circuit means produces an actuating signal, and circuit means which receives that actuating signal operates the solenoid 3 and the associated latching means to unlatch the fast rewind atuator button 2 and automatically return the drive to the original direction of tape movement (FIG. 2).

Figure 1A:
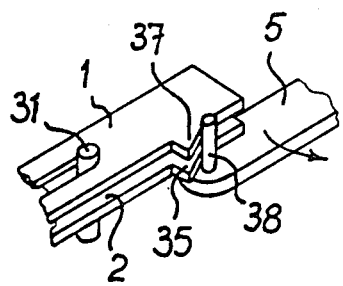

After this rewind actuator button 2 has been unlatched, it re-asumes the position shown in FIG. 1 due to the action of its spring 36.

Moreover, as the solenoid 3 has reversed the direction of travel of the tape, the lever 14 is rocked again (FIG. 2) and thus re-assumes its position shown in FIG. 1.

An important feature of the invention is that the end of the lever 14 is fork-shaped (39) and this permits the reengagement between the lever 14 and the tenon 85 of the slide 15 of the switch 16 if, for any reason, this slide 15 is displaced from direct alignment with the lever 14.

With the apparatus in the position shown in FIG. 1, forward drive of the tape resumes at playback speed, to play the recording which the user wishes to listen to again.

The desired object is thus achieved using very simple means. The only modification to be made to a bidirectional apparatus in which the magnetic head is switched as a function of the direction of travel of the tape, therefore, involves mounting a lever 14 on a movable plate 26 movable to disengage the lever from the switch slide 15 before reversal of the direction of travel of the tape when the user wishes to seek the beginning of a recording at high speed.

The embodiment described in FIGS. 1 to 3 also allows the fast forward and rewind detectors to be unlatched without any additional mechanical parts. The single reversing device fulfills all these functions.

The end 39 of the lever 14 is designed in such a way that the re-engagement of the connecting lever 14 allows it to operate simultaneously in order to check that the magnetic head is correctly switched as a function of the direction of travel of the tape.

If it is assumed (referring to FIG. 3) that the user simultaneously actuates while the fast reward button 2 is latched the fast forward button 1, its pawl 37 will cause the lever 5 to pivot in such a way that the fast rewind button 2 will be unlatched and will return to its inoperative position under the influence of the spring 36 connected to it, without reversing the drive which remains in the rewind direction but at playback speed.

The apparatus is thus in the normal playback position, as shown in FIG. 1, but the tape travels in the rewind direction.

As the magnetic head elements have not been switched, the wrong set of channels are enabled and will remain so indefinitely.

Figure 4:
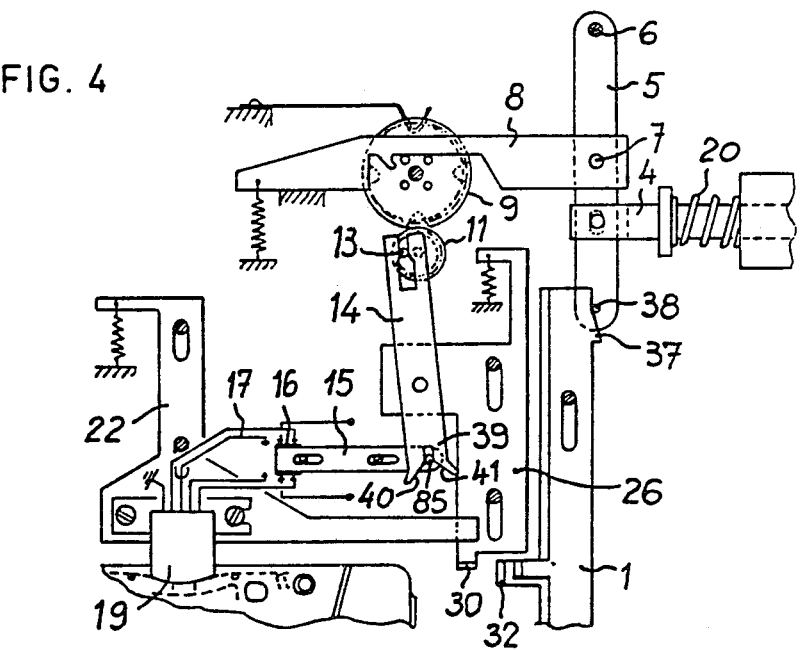

To solve this problem, the end of the lever 14 comprises two ramps 40, 41 which displace the slide 15 of the switch 16 during the return of the plate 26 to its inoperative position (FIG. 4) in order to resynchronize the direction of travel of the tape and the enabled set of head channels (see FIG. 4).

B. Electronic Embodiment

Figure 5:
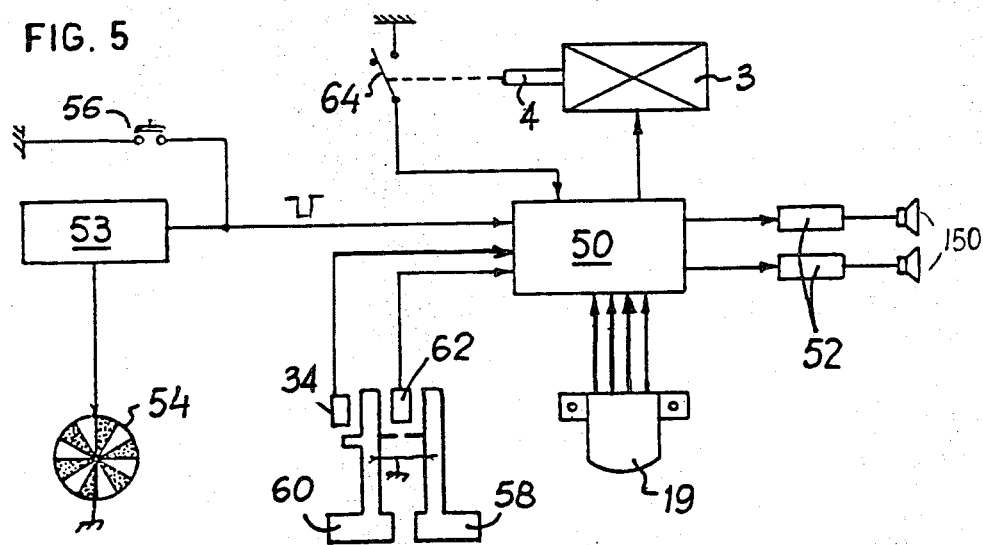
FIG. 5 is a block diagram of an electronic embodiment of the invention.

According to the preferred embodiment of the invention, which incorporates electronic means for enabling one set or the other channels of the magnetic head 19, in order to select either the forward tracks T1, T2 or reverse tracks T3, T4 of the tape, switch means for the head channels is provided by a set of solid-state analog switches 102A, B, C, D (FIG. 6) included in the control circuit 50 shown in the block diagram FIG. 5. Preferably, the switches 102A, B, C, D are CMOS type transmission gates such as the IC of type number 4066, and, referring to FIG. 6, in the forward direction of tape movement, the switches 102A, B in their normal closed state enable head channels for tracks T1, T2, and in the reverse direction of tape movement the analog switches 102C, D are in their closed state and enable channels for tracks T3, T4. The switches 102A, B are maintained normally closed in the forward direction of tape movement when no signal appears on lines 104, 106; switches 102A, B are opened and switches 102C, D are closed by a channel select signal on line 106 and its complement on line 104.

With the switching of the channels of the magnetic head 19 performed electronically, the mechanical switch 16 of the mechanical embodiment of the invention and associated mechanical components 15, 14, 26 for actuating the switch are not needed. Instead, the selection of the tracks T1, T2, T3, T4 for playback is determined by the logic states of switches 34, 54, 56, 62 and 64, as shown in the functional block diagram of FIG. 5.

Referring to FIG. 5, normally open push-button switch 56 is for user operation to reverse the direction of tape movement at normal playing or recording speed. Closing the switch 56 actuates the solenoid 3 to mechanically reverse the direction of the tape drive. The direction of the drive is represented by the state of the switch 64, and the logic state of switch 64 is used to derive the control signals to the analog switches 102, located in the solenoid control and head channel switching control circuitry 50. The analog switches 102 connect either the upper T1, T2 or lower T3, T4 track channels of the head 19 to the stereo amplifiers 52. Thus the tape head channel selection changes to accommodate the direction of tape movement at normal speed each time the normally open push-button switch 56 is pressed to reverse the drive. The same result is achieved on automatic reversal of the drive. The tape player automatically reverses the direction of tape travel at the end of the tape in either direction, by sensing the motion of the cassette drive spindles and thus the motion of the tape itself by means of switch 54 mechanically driven by the motor drive to the take-up spindle. Motion sensing circuit 53 continuously monitors the periodic change in logic state of the switch 54 and emits an inverted pulse to actuate the solenoid 3 if the logic state of switch 54 is not periodically changing. This motion-sensing circuit 53 is preferably of the type described in Schatteman U.S. Pat No. 3,488,017, to which reference may be made for further details.

The solenoid control and head switching control circuit 50 also switches the tape direction without switching head channel selection during fast rewind initiated by fast rewind actuator or push button 60. Switch 62 closes to ground when either of the fast forward 58 or fast rewind 60 push-buttons are depressed. These push-buttons 58, 60 mechanically latch closed and are released when solenoid 3 is actuated. The closure of the fast rewind button 60 is also individually sensed by switch contact 34. When the rewind button 60 is depressed, solenoid 3 is actuated quickly enough so that the rewind button will still be latched by the time the user releases manual pressure from the button 60. The track selection, however, does not change even though the tape travel direction changes so that the same set of head channels is enabled and connected to the silence detecting portion 110 (FIG. 6) of control circuit 50 in rewind as in playback operation. Thus, the circuit 50 responds to the sound programming recorded on the same tracks that were selected before the fast rewind button 60 was depressed. When the silence detecting components 110 find a blank interval in the sound programming, the solenoid 3 is actuated to resume the normal tape direction, and release the latched rewind button 60, but again the track selection and head channel selection does not change. Upon activation of the fast forward button 58 there is no need to change track selection or head channels. However, the solenoid 3 must be actuated by the circuit 50 to release the fast forward button 58. This also changes the tape travel direction, and thus the solenoid 3 is actuated a second time by the control circuit 50 to resume forward tape travel. Considering the logic states of switch 64 representing tape travel direction and switch 34 detecting the selection of fast rewind, the logic state of the desired head channel and track selection is the Exclusive OR of the logic states of switches 34 and 64, since the polarity of the track selection must be opposed to the polarity of the tape travel only when the rewind sensing switch 34 is closed.

Figure 6:
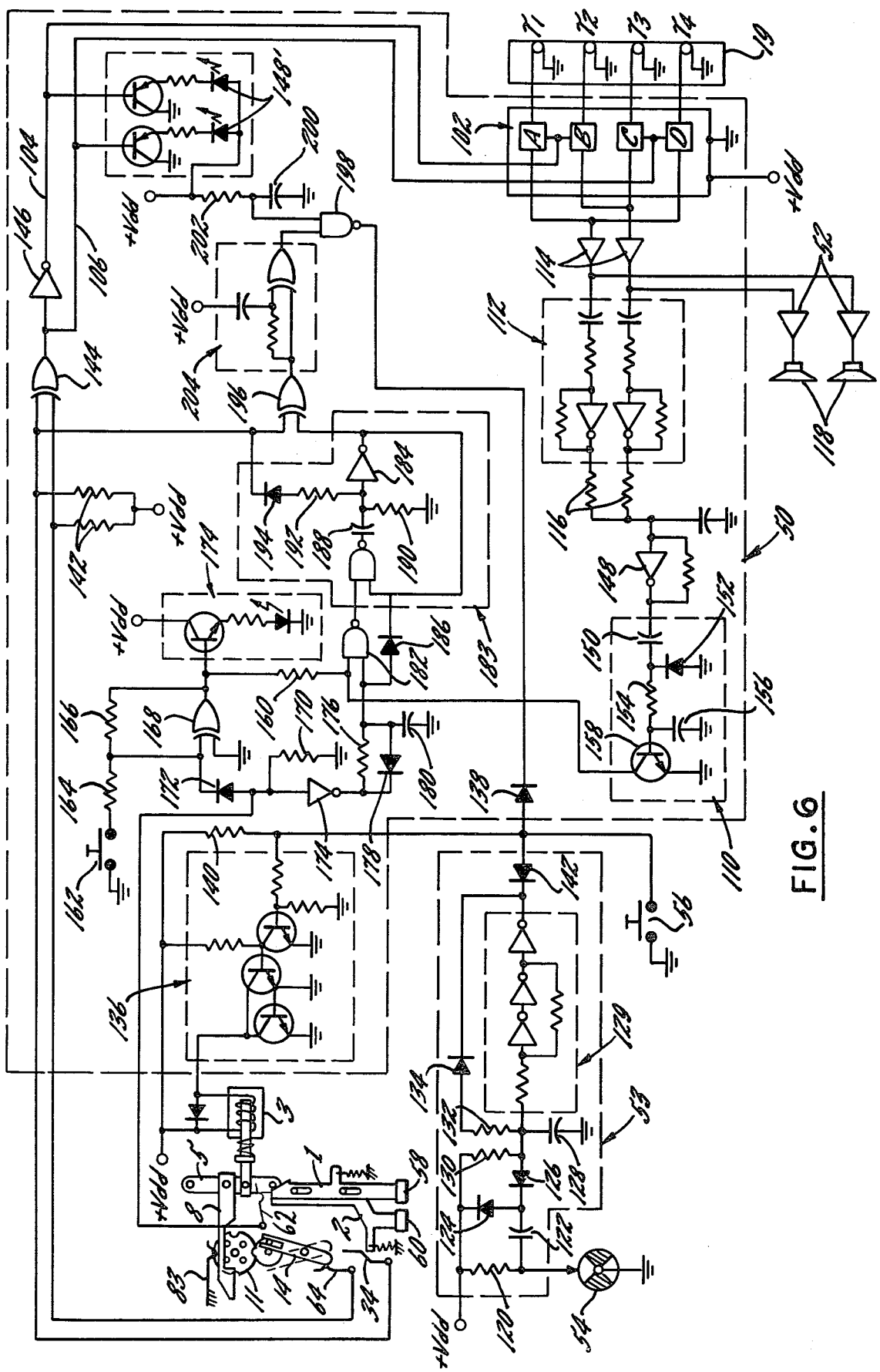
FIG. 6 is a schematic diagram of the embodiment of the invention shown in FIG. 5.

Now turning to FIG. 6 which is a detailed schematic of a CMOS embodiment of the circuits shown in the block diagram of FIG. 5, the user actuated push button 56 for reversing the tape drive at normal speed is shown adjacent the automatic circuit 53 for reversing the drive at the end of the tape by detecting the stoppage in motion of the take-up reel by means of the commutator switch 54. Also included in FIG. 6 are the push button actuators 58 and 60 for fast forward and fast rewind, and the solenoid 3 which operates the tape drive.

The silence detection circuit 110 and associated control circuitry constructed in accordance with this invention, is also shown connected to receive the output from a stereo buffer amplifier 112. Amplifier 112 amplifies the stereo outputs of the preamplifier 114 so that the mixing of the two stereo channels by resistors 116, to provide a signal containing the output of both channels for the silence detection circuit to detect the long intervals or gaps between sound programming, does not degrade the stereo separation of the audio channels driving the loudspeakers 118.

Referring first to the portion of FIG. 6 containing the tape motion detection circuit 53, that circuit includes a load resistor 120 so that an AC signal is produced by the commutator 54 when the tape is traveling. The AC signal is coupled by capacitor 122 and rectified by diodes 124, 126 to keep capacitor 128 discharged when the tape is moving. Otherwise, capacitor 128 functions as the memory element of a conventional aperiodic Schmitt trigger oscillator using a Schmitt trigger 129, charging resistor 130, discharge resistor 132, and directional diode 134. The charge time constant of the capacitor 128 is selected to be greater than the period of the signal generated by commutator 54 when the tape is moving at normal play or record speed. Thus, when the commutator switch ceases rotation when the tape stops, and the capacitor 128 becomes charged, an inverted pulse is produced by the circuit 53 and transmitted to actuate the solenoid 3 via a solenoid driver circuit 136. The solenoid may also be actuated by closing pushbutton switch 56 or by a low signal at the cathode of diode 138, produced by the control circuits shown in FIG. 6 in response to operation of the fast rewind button 60, with resistor 140 and diodes 138, 142 performing a logical OR function.

Energizing solenoid 3 causes the tape drive to switch the direction of tape travel, sensed by the logic state of switch 64. In carrying out the invention, head channel selection is not changed when the fast rewind button is operated, which is sensed by deriving the Exclusive OR of the logic state of the switch 34 and the switch 64 which senses the reverse direction of tape movement when it is closed. Closure of switch 64 and fast rewind switch 34 are converted to CMOS logic levels via load resistors 142' and the Exclusive OR is obtained by Exclusive OR gate 144 to generate a channel select signal on line 106 and the complement on line 104 after inversion by inverter 146, only when the switch 64 is closed and the fast rewind switch 34 is open. To indicate what "side" of the cassette is currently selected, light-emitting diodes 148 buffered by conventional emitter-follower drivers are provided.

The select signals on lines 104, 106 are presented to the control input of CMOS transmission gates 102 for selecting the head channels corresponding to either the upper tracks T1, T2 or lower tracks T3, T4 of the tape. The selected track signals from the head 19 are amplified by the stereo amplifier 114 conventionally used in cassette players and then amplified by the stereo amplifier 52 for driving loudspeakers 118.

In keeping with the invention, the sum of the stereo channels appears at the output of the mixing amplifier 148' and is transmitted to the silence detection circuit 110 for that circuit to determine the gaps in recorded sound. In the processing of the signals, the stereo buffer amplifier 112 and mixer amplifier 148 use conventional CMOS inverters biased for linear operation. The output of mixer amplifier 148 is AC coupled by capacitor 150 to the silence detection circuit.

In carrying out the invention, the input to the silence detection circuit is rectified by the rectifier diode 152 and the rectified audio signal is low-pass filtered by resistor 154 and capacitor 156 for activating the threshold-detecting transistor amplifier consisting of transistor 158 and load resistor 160. The transistor 158 is turned on by a recorded signal about $-22$ db and capacitor 156 is sufficiently large to hold transistor 158 on for approximately 0.1 seconds, so that transistor 158 will turn off when a blank interval in the recorded sound having a minimum duration of three seconds at playback speed and a level below $-22$ db is detected during playback of the cassette tape. The silence detection output at the collector of transistor 158 may also be inhibited by closing a disable switch 162, which allows the user to switch off the silence detection circuit when it is actuated a few seconds ($\approx 3$) before or after actuation of fast forward or fast rewind push buttons 58, 60, to obtain either of those functions without silence detection. The signal generated by the disable switch 162 is cleaned up by a Schmitt trigger consisting of series resistor 164, feedback resistor 166, and a positive-gain buffer 168 which is made of an Exclusive OR gate. When the disable switch 162 is open, the output of the buffer 168 is high, at approximately $+VDD$, since the input of the buffer 168 is pulled high by resistor 170 and diode 172. The output of buffer 168 is indicated by light-emitting diode circuit 174 and is used as the pull-up supply of load resistor 160. Diode 172, with its anode shunted to ground by fast sensing switch 62, is used so that the circuit will not respond to a change in the disable (closed) to an enable (open) position when the player is in the fast forward or fast rewind model (after 3 seconds); this additional logic function prevents false silence detection that could occur as the transfer characteristic of transistor 158 changes as the collector current is switched on by opening the disable switch 162. The disable switch 162 has no effect on the logic state of the fast sensing switch 62 since load resistor 160 is selected to have a resistance of about one-third the value of resistor 164. This logic state is inverted by inverter 174 and delayed by resistor 176, directional diode 178, and capacitor 180 and applied to the input of NAND gate 182 to inhibit gate 182 when the fast switch is open and for approximately two seconds after the fast switch is closed.

The output of gate 182 goes low on the detection of a gap of silence, when the gate is not inhibited, to fire a conventional astable multivibrator, or "one-shot" circuit 183 including the inverter 184. Directional diode 186 provides feedback to discharge the delay capacitor 180 when the one-shot is fired in order to inhibit multiple firings. The one-shot pulse width produced at the output of inverter 184 is approximately the RC product of capacitor 188 and resistor 190, about ½ second, when the player is in the fast forward mode, but in the fast rewind mode the width is shortened to about 15 milliseconds by the switching in of resistor 192 when the cathode of switching diode 194 is shunted to ground by the closure of the fast rewind sensing switch 34. When the rewind sensing switch 34 is first closed, the switch signal applied to Exclusive OR gate 196 causes a transition in the gate output which is converted to a pulse of duration approximately 50 milliseconds by a transition-to-pulse converter circuit 204. This pulse is gated by the power-on-inhibit gate 198, which is inhibited when the power supply is first switched on by cassette insertion for about 150 milliseconds as capacitor 200 is charged to one-half supply voltage +Vdd, through resistor 202. The pulse then passes through directional diode 138 to energize the solenoid 3 for switching the direction of tape motion. In fast rewind, upon detection of a gap of silence, the pulse generated by the one-shot 183 is about 15 milliseconds which is so short that it passes through pulse generator 204 as a single pulse, and thus solenoid 3 is energized only once at the end of the fast rewind mode. Although this 15 millisecond pulse is followed by a 50 millisecond pulse as the fast rewind switch 64 signal input to Exclusive OR gate 196 makes a low to high transition when the latching of the reverse button 60 is released, the delay between the pulses is so short that solenoid 3 responds in a single stroke. During the fast forward mode, however, the one-shot 183 generates a pulse of approximately ½ second upon detection of a gap of silence. Then the pulse generating circuit 204 outputs two 50 millisecond pulses, spaced far enough apart, by 500 milliseconds, that solenoid 3 responds with two strokes. The first stroke unlocks the latching of the fast forward button 58, but also reverses the direction of tape travel. The second stroke reverses the tape travel to the original forward direction. Although the head channel selection is also reversed by the first stroke of the solenoid 3 it is incorrect for only about 500 milliseconds which is too short to be detected by the audio amplifier 52, which is conventionally switched off during fast tape motion and held off for about one second later while the tape slows to proper speed.

I claim:

1. In a tape transport having a bi-directional drive for movement of tape at playback speed and fast speed in either direction; a soundtrack pick-up head operatively positioned to engage the tape, said head having two sets of head channels for detecting recordings on respective sets of recording tracks on recording tape; switch means shiftable from one state to another for enabling one set or the other of said sets of head channels; signal detection circuit means for receiving audio signals from the enabled set of head channels and for producing actuating signals in response to a silence interval of predetermined minimum duration in said audio signals indicating a silence period between recordings on the corresponding set of recording tracks; drive control means including a reversing mechanism operable to reverse the drive for movement of tape at playback speed or fast rewind speed; and a fast rewind actuator; the improvements comprising:

means connecting said reversing mechanism for said bi-directional drive to said switch means, including means having two states representing the respective directions of tape movement connected for shifting the state of said switch means and switching the enabled sets of head channels to accommodate the direction of tape movement upon reversal of said drive;

means for disconnecting said connecting means from shifting the state of said switch means upon reversal of said drive for movement of the tape at fast rewind speed so as to maintain the same state of said switch means and enabled set of head channels;

said connecting means being operable to shift the state of said switch means upon reversal of said drive for movement of the tape at playback speed; and means for connecting said actuating signals from said silence detection circuit means to operate said drive control means and actuate said reversing mechanism during movement of the tape by said drive at fast rewind speed.

2. The improvements in a tape transport according to claim 1 wherein said reversing mechanism includes a control solenoid and a member operated by said solenoid to reverse the drive;

said connecting means includes a mechanical linkage between said operating member and said switch means having a pivotable lever mounted on a movable supporting plate and operable to shift a switch element from one state to another, and said means disconnecting said connecting means includes a member engaging said supporting plate upon actuation of said rewind actuator and moving said supporting plate to separate said pivotable lever from said switch element upon reversal of said drive for movement of the tape at fast rewind speed.

3. The improvements in a tape transport according to claim 2 wherein said switch means has multiple output terminals and a movable switch element operated by said pivotable lever to switch output terminals and enable one set of head channels or the other.

4. The improvements in a tape transport according to claim 2 wherein said fast rewind actuator acts sequentially on said plate to disconnect said lever from said switch element and on a switch included in a circuit connected to operate said reversing mechanism for reversing the direction of movement of the tape at fast rewind speed.

5. The improvements in a tape transport according to claim 2 wherein the end of said lever for engaging and shifting the switch element is fork-shaped so as to ensure that the switch element is locked in one of its two states.

6. The improvements in a tape transport according to claim 5 wherein the end of the lever comprises two ramps which, during the return of the plate into its inoperative position, engage the switch element in the event it is located in the reverse state and shift the element to the state to enable the head channels for the selected tracks.

7. The improvements in a tape transport according to claim 1 wherein said reversing mechanism includes a control solenoid and a member operated by said solenoid to reverse the drive, said connecting means includes a reverse sensing switch actuated by said member to send a signal through circuit means including an Exclusive OR gate to operate said switch means, and said means disconnecting said connecting means includes a second switch connected to an input of said Exclusive OR gate and operated by said fast rewind actuator to send a blocking signal to said gate so as to maintain the same state of said switch means upon reversal of said drive movement of the tape at fast rewind speed.

8. The improvements in a tape transport according to claim 7 wherein said switch means comprises a set of solid state transmission gates controlled by signals from said circuit means to enable one set of head channels or the other.

9. The improvements in a tape transport according to claim 8 including a fast forward actuator, latching means for said fast forward actuator associated with said reversing mechanism and operable to latch said fast forward actuator upon actuation thereof and operable to unlatch said fast forward actuator upon operation of said reversing mechanism when said fast forward actuator is latched, said circuit means including means for operating said reversing mechanism twice responsive to actuating signals from said silence detection circuit means when said bi-directional drive is operable to move the tape in the fast forward direction to unlatch said fast forward actuator upon the first reversing operation and to return the drive to the original playback direction upon the second operation of said reversing mechanism.

10. The improvements in a tape transport according to claim 9 in which said latching means includes pawls carried respectively by said fast forward actuator and fast rewind actuator engageable with a latching member associated with said reversing mechanism so that said latching member engages said pawls to hold said actuating members.

11. The improvements in a tape transport according to claim 1 further including circuit means receiving actuating signals from said silence detection circuit means and connected to operate said reversing mechanism and return the drive to the original direction of tape movement.

12. The improvements in a tape transport according to claim 6 including latching means for said rewind actuator associated with said reversing mechanism and operable to latch said rewind actuator upon actuation thereof and operable to unlatch said rewind actuator upon operation of said reversing mechanism when said rewind actuator is latched.

13. The improvements in a tape transport according to claim 7 wherein actuating signals from said silence detection circuit means with said drive operable to move the tape at fast rewind speeds operates said reversing mechanism to unlatch said rewind actuator and return the drive to the original playback direction of tape movement.

14. The improvements in a tape transport according to claim 1 wherein said reversing mechanism includes a control solenoid and a member operated by said solenoid to reverse the drive, said connecting means includes a reverse sensing switch actuated by said member and sending signals through a circuit including means for performing an Exclusive OR function to operate said switch means, and said means disconnecting said connecting means includes a second switch connected to said circuit means performing an Exclusive OR function operated by said fast rewind actuator to send a blocking signal so as to maintain the same state of said switch means upon reversal of said drive for movement of the tape at fast rewind speed.

15. In a tape transport having a bidirectional drive for movement of tape at playback speed and fast speed in either direction, and a pick-up head with separate sets of head channels for separate recording tracks on tape, the improvements comprising:

signal detection circuit means for receiving audio signals from one or the other sets of head channels and for producing actuating signals in response to a silence interval of predetermined minimum duration in audio signals indicating a silence period between recordings on the corresponding set of recording tracks, means for switching said sets of head channels, control means for said drive including a member having two states representing the respective directions of tape movement, means connecting said member to operate said switch means for switching the sets of head channels to accommodate the direction of tape movement upon reversal of the drive, and means disconnecting said member from operating said switch means upon reversal of the drive for movement of the tape at fast rewind speed, so as to maintain the same set of channels enabled in order to playback the same tracks for detection of silence intervals as those selected for listening.

* * * * *